Feb. 12, 1935.  L. F. CASTRO  1,990,814
VARIABLE PITCH PROPELLER
Filed April 12, 1933   4 Sheets-Sheet 1

INVENTOR
LIZANDRO FERNANDEZ CASTRO
BY
ATTORNEY

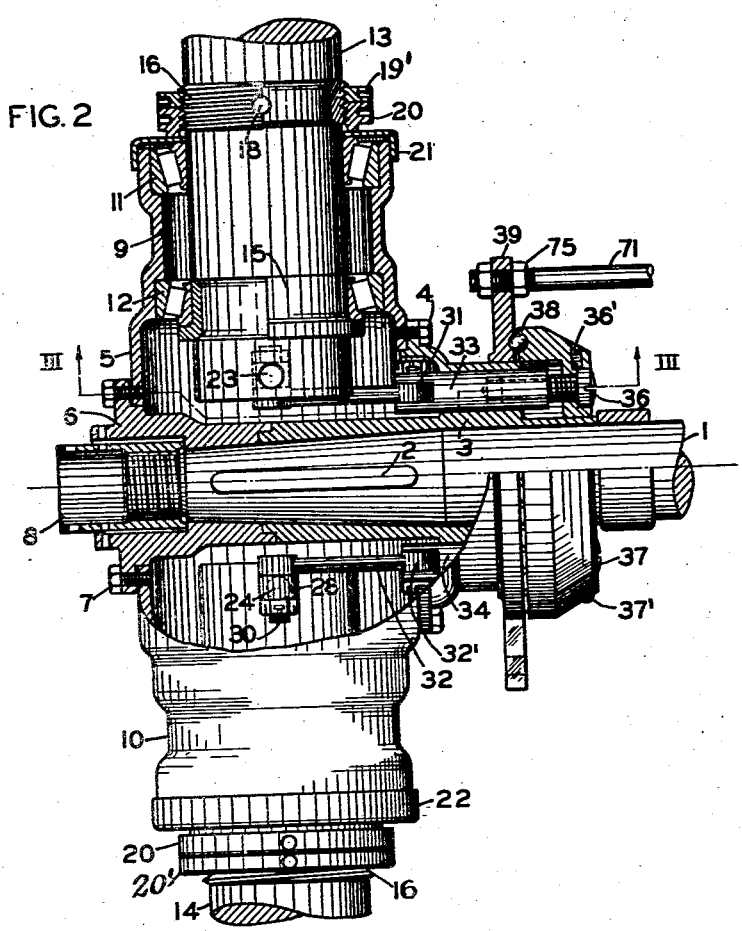
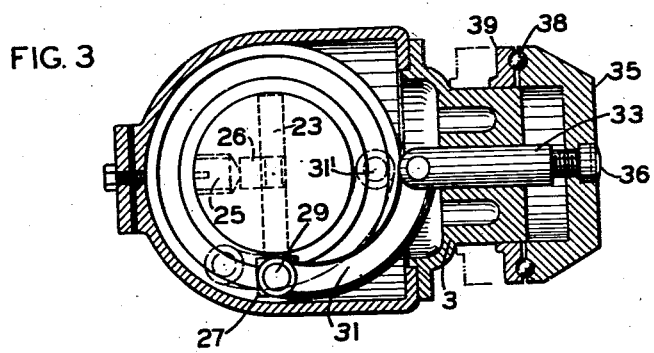

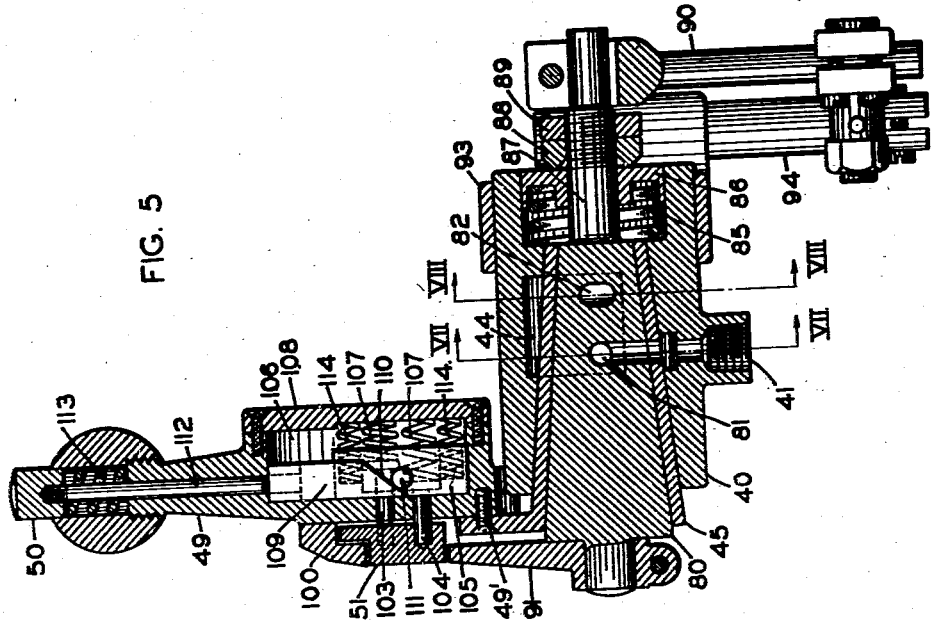

Feb. 12, 1935.  L. F. CASTRO  1,990,814
VARIABLE PITCH PROPELLER
Filed April 12, 1933   4 Sheets-Sheet 4

INVENTOR
LIZANDRO FERNANDEZ CASTRO
BY
ATTORNEY

Patented Feb. 12, 1935

1,990,814

UNITED STATES PATENT OFFICE 1,990,814

VARIABLE PITCH PROPELLER

Lizandro Fernandez Castro, San Francisco, Calif.

Application April 12, 1933, Serial No. 665,731

4 Claims. (Cl. 170—163)

This invention relates to improvements in variable pitch propellers and more particularly to a combined pitch control and responding index for aircraft propellers.

Among the objects of the invention are to control the thrust of the propeller without necessarily varying its driven speed.

Another object is to provide a remote control for varying the pitch of the propeller while in action.

Another object is to automatically maintain the selected pitch.

A further object is to provide responsive means for positively indicating the degree of pitch at which the propeller is actually operating.

Other objects and advantages will appear as the description progresses.

In aircraft practice, controllable pitch propellers have demonstrated greatly increased overall efficiency of propulsion.

There are so many variables in the conditions under which aircraft propellers operate that a propeller with a fixed pitch is at best a compromise between the extremes.

In the "take off" a fine pitch permitting high engine speed is desirable. At "cruising speed" the pitch of the propeller should be in ratio to the best working engine speed. In the higher altitudes a coarse pitch is desirable. In "landing" a fine pitch or neutral enables the pilot to keep his motor operating at acceleratable speed to meet emergencies. A further safety element can be introduced by reversing the propeller with suitable engine speeds to retard the progress of the craft.

It is important also that the pilot know positively that the propeller blades have responded to the variable control as indicated by the responsive index forming part of this invention.

In this specification and the accompanying drawings, the invention is disclosed in its preferred form. It is to be understood, however, that it is not limited to this form because it may be embodied in other forms and applications without departing from the spirit of the invention as defined in the claims following the description.

In the four sheets of drawings:

Fig. 2 is an enlarged fragmentary detail of the hub of the propeller partly broken away in vertical section to disclose the inner assembly of the blade control mechanism.

Fig. 3 is a horizontal section of the same taken on the line III—III, Fig. 2.

Fig. 4 is an enlarged detail in front elevation of the control valve of the remote control mechanism.

Fig. 5 is a vertical section of the same taken on the line V—V, Fig. 4.

Figure 1:
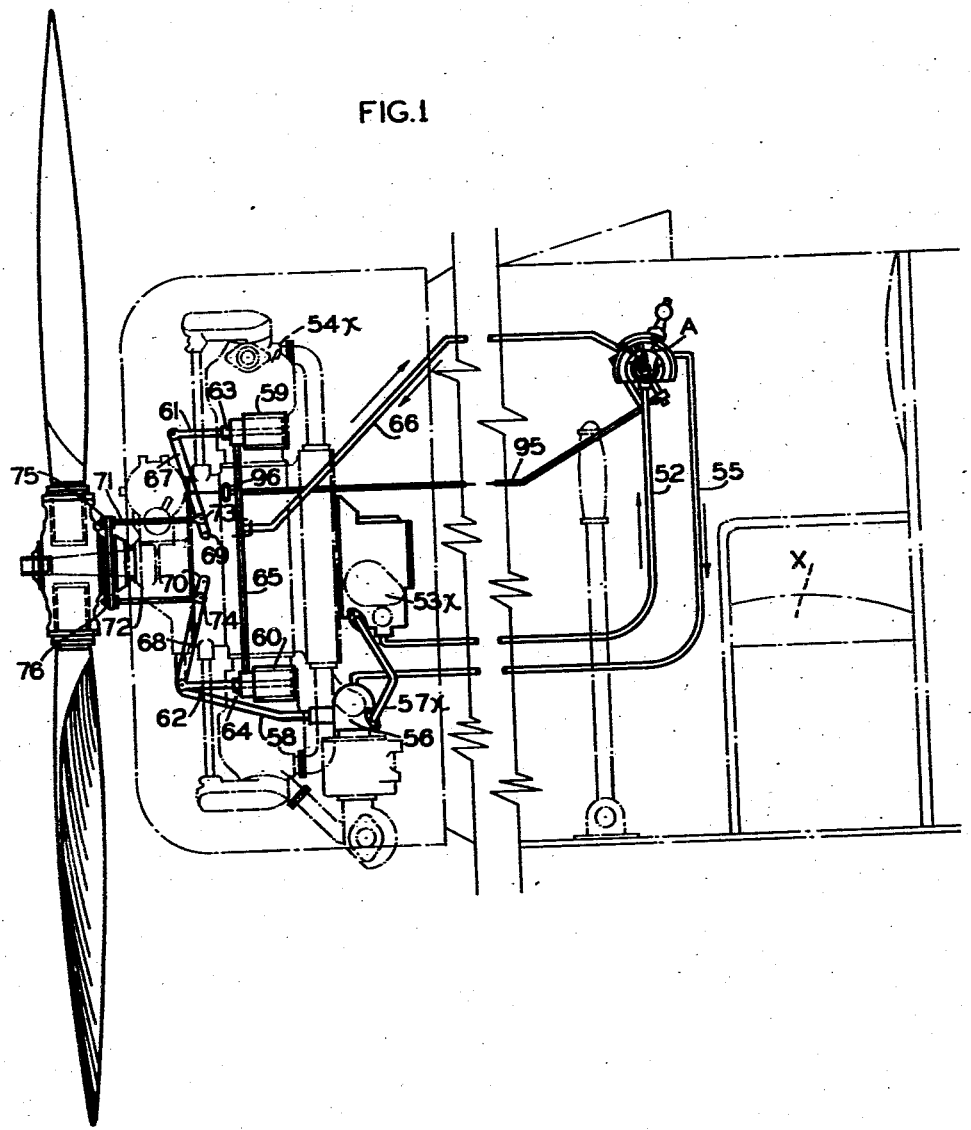
Fig. 1 is a side elevation diagrammatically illustrating a variable pitch airplane propeller, remote control and responsive index, constructed in accordance with this invention and combined and applied to the forward portion of an airplane shown in dotted lines.

In detail the construction shown in the drawings, referring to Fig. 2, comprises the tapered motor shaft 1 having the key 2 engaging the tapered hub 3. This hub is flanged and bolted at 4 to the tubular housing 5. The forward extension 6 of the hub engages the tapered shaft and key and is also flanged and bolted at 7 to the housing 5. The hub is forced onto the shaft and locked by the annular nut 8 threaded onto the end of the shaft.

The housing has the tubular sockets 9—10 to receive the annular antifriction bearings 11—12. The roots 13—14 of the propeller blades, respectively, extend into these sockets and frictionally engage the cones of the opposed bearings 11—12. The inner ends of these roots have annular grooves therein to receive split collars such as 15 which are flanged to engage the bearings 12 to take the centrifugal pull of the propeller blades.

The external portions of the roots are similarly grooved to receive the threaded split collars 16—17 fixed to the roots by the pins 18 respectively. The running nuts 19—20 bearing on the caps 21—22 interposed between them and the cones of the bearings 11—11 respectively, provide means for taking up all lost motion in the bearings 11—12 to prevent chattering in the propeller blades when in operation. The adjustment of these nuts is fixed by the lock nuts 19'—20'. Thus mounted in the bearings, the propeller blades are free to rotate on an axis transverse to the axis of the motor shaft 1.

The normal pitch of propellers is determined by the duty to be performed and the angle of the blades fixed accordingly. Since the conditions of flight, altitude, take-off and landing vary, it is desirable to vary this normal angle to meet immediate conditions as previously stated.

Referring to Fig. 3, the transverse pins 23—24 extend through the roots of the blades respectively and are fixed therein by the set screws 25, threaded into the roots and forcing the blocks 26 into annular grooves in the pins. The heads 27—28 of these pins protrude to receive the pivots 29—30 to which the links 31—32 are pivoted at one end. Their opposite ends are pivoted at 31'—32' to the plungers 33—34 guided in holes in the hub 3 parallel with the axis of the shaft 1. The ends of these plungers are fixed to the revolving hollow thrust collar 35 by the bolts 36—37 locked by the set screws 36'—37'. These bolts 36—37 screwed into the plungers also provide micrometric means for fine adjustments in the normal pitch angle of the blades from which basic pitch the variable pitch control starts and returns. The antifriction thrust bearing 38 is interposed between the collar 35 and the plate 39, slidable in the hub 3, see Fig. 2.

In operation, the normal thrust of the propeller blades urges the control assembly toward the relative positions indicated in dotted lines in Fig. 3 which is the basic pitch. The full lines in Figs. 2–3 indicate the "neutral" or "zero" pitch. The position indicated in Fig. 1 is full pitch ahead. It will be noted that in the coarsest pitch, the collar 35 abuts the hub 3 to form a definite stop for maintaining the basic pitch which is assumed by the natural thrust urge.

Figure 7:
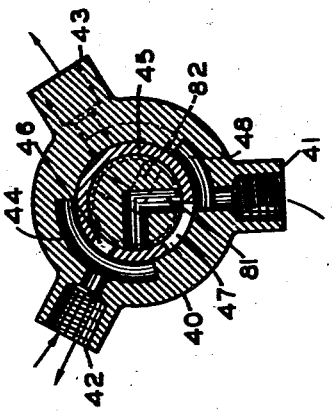
Fig. 7 is a cross section of the valve taken on the line VII—VII, Fig. 5.
Figure 6:
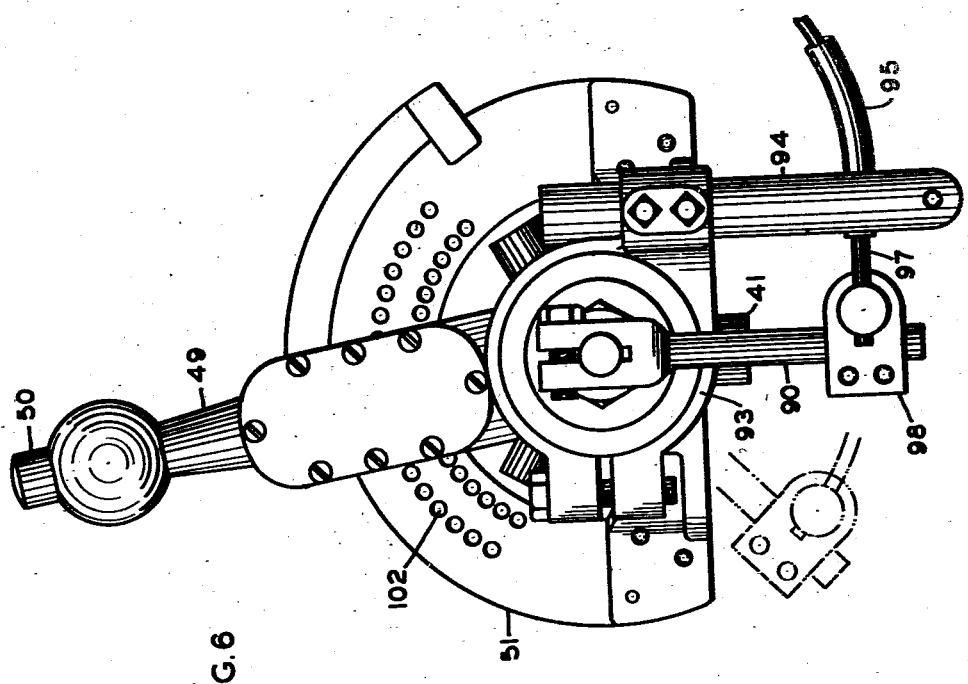
Fig. 6 is a rear view of the valve shown in Fig. 4.

The manual control, see Figs. 5–7, comprises the valve block 40 mounted within easy reach of the pilot who sits in the seat $x$. This block has the inlet port 41 and the two outlet ports 42 and 43. The outlet port 42 has the lead 44 extending around the center bore of the block. The taper sleeve control valve 45 has the angular ports 46—47 adapted to register with the inlet port 41 and the lead 44 of the outlet port 42 and the lead 48 of the inlet port 41, see Fig. 7.

The sleeve valve 45 is provided with the operating handle 49 fixed thereto at 49'. This handle has the thumb release button 50 operating a latch engaging holes in the quadrant 51 fixed to the valve body as hereinafter more fully described.

The inlet 41 is connected by the conventional metal tube 52 with the outlet of the oil pump 53$x$ of the internal combustion motor 54$x$. The return outlet port 43 is similarly connected by the tube 55 with the closed oil sump 56 on the motor. From this sump the oil is returned through the tube 57$x$ to the pump 53$x$ after circulating through the motor in the usual manner. From the various motor lubricating ducts, the oil returns to the sump through the tube 58.

The power units interposed between the propeller blade assembly and the remote control above described comprises a pair of closed cylinders 59—60 mounted upon the engine block or any convenient portion of the aircraft. These cylinders contain single acting pistons with the piston rods 61—62, respectively, extending through the stuffing boxes 63—64. These cylinders are cross-connected by the tube 65 between the pistons and the stuffing boxes so that the pistons act in unison when the power is applied. This cross tube 65 is connected by the supply tube 66 with the outlet port 42 in the control valve.

The piston rods 61—62 are respectively pivoted in slots in the ends of the levers 67—68 the other ends of which are pivoted at 69—70 to the motor block.

These levers are connected by the links 71—72, pivoted thereto at 73—74 respectively, and adjustably connected to the thrust plate 39, see Figs. 1–2. Thus connected, the manual control is arranged to retract the collar 35 against the normal urge of the propeller blades in the opposite direction.

The handle control 49 and the valve assembly are arranged to utilize the pressure of the lubricating oil system of the motor as a source of power to adjust the propeller blades. Such closed oil circulating systems are capable of maintaining pressures up to 100 pounds per square inch. The valves 45—80 admit oil pressure to actuate the power units 59—60 to manually adjust the propeller toward the fine pitch against the urge of the propeller to return to the basic coarse pitch.

The "responder" mechanism is interposed between the propeller assembly and the control valve assembly.

Figure 8:
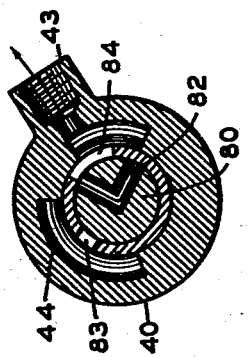
Fig. 8 is a similar view taken on the line VIII—VIII.

The "responder" includes the taper plug valve 80, coaxial with the control sleeve valve 45, see Fig. 5, and having two interspaced angular transverse passages 81—82, respectively, adapted to register with the ports 46—47 and 83—84 in the sleeve valve 45, see Figs. 7–8.

In Fig. 8, the angular passage 82 is adapted to register with the ports 83—84 in the control valve 45. Both of these valves 45—80 are pulled snugly into the block 40 by the spring 85 expanding between the end of the block and the collar 86 slidable on the reduced stem 87 of the plug valve. The tension adjusting nut 88 is threaded on this stem and locked by the jam nut 89. The nut 88 has a reduced annular bearing against the collar 86 to permit it to oscillate freely when the responder valve 80 is turned.

The arm 90 has a bifurcated head clamped upon the end of the stem 87 and moves therewith. The index 91 is similarly clamped upon the opposite end of the valve and cooperates with the graduated scale 92 on the quadrant to indicate with precision the pitch of the propeller as selected by the handle 49.

The clamp 93 is contracted about the end of the valve body 40 to hold the adjustable bracket 94 in the split end of which the tube 95 is clamped, see Fig. 6. This tube extends forward and is anchored at 96 to the motor block in proximity to the lever 67. The flexible wire 97 moves freely within this tube and is attached to the lever 67 and the clamp 98, adjusted on the arm 90, to cause this arm to move in unison with the lever 67 or any other suitable moving part of the propeller assembly.

Any change in the pitch of the propeller blades is communicated through the movement of this wire and is indicated on the scale 92 synchronously with the movement of the valve 45.

The handle 49 has the index pointers 100—101 registering with the graduated scale 92. The rear of the quadrant 51 is provided with holes 102 coinciding with the graduations 92 on the face of the quadrant, see Fig. 6. These holes are in offset relation so that the number necessary may be placed in the limited space and retain a good working size of the holes. The detents 103—104 are slidable in holes in the handle 49, see Fig. 5. These detents are guided in the block 105 which is guided in the recess 106 in the handle. The springs 107—107, expanding between the heads of the detents 103—104, respectively, and the cover 108, urge the detents toward the quadrant.

The yoke 109 is vertically guided in the recess 106, straddles the block 105, and has the inclined ends 110 engaging in front of the lugs 111. The stem 112 is fixed in the yoke and operated by the button 50 against the expansion of the spring 113. The block 105 is urged forward against the inclined ends 110 by the springs 114—114. When the button is depressed, the detents 103—104 are retracted. When the button is released, one or the other of the detents will engage a hole 102, in the quadrant 51 and hold the handle 49 in adjusted position.

This invention operates substantially as follows:

In Fig. 4, with the handle index 100 on the zero point A, the entire control mechanism is locked by impounded oil. The propeller is set at its normal coarsest pitch suitable for higher altitudes or cruising.

If it is desired to decrease the pitch, the pilot releases the latch button 50 and pushes the handle 49 forward, see Fig. 7. The forward movement of the handle rotates the control valve 45 which brings its port 46 into registry with the passage port 81 in the responder valve 80. The oil pressure then flows through the ports 41, 47, 81, 46, 44 and 42, through the tubes 66 and 65 into the power units 59—60. The pistons in these units operate the interposed lever assembly to retract the collar 35 and decrease the pitch of the propeller blades in unison. The handle 49 is then locked at the selected degree of pitch desired as indicated by the index 100 on the graduated scale 92, for instance "7°" of decreased pitch.

When the propeller has responded to the "charge" of oil selected by the handle 49, the wire 97 backs up through the tube 95 and actuates the "responder" mechanism which rotates the plug valve 80 and moves the index 91 to "7°" on the scale 92. The forward rotation of this valve 80 cuts off the passage port 81 at 46 and impounds the oil in the system forward of the control valve, which locks the propeller pitch at "7°".

Should there be any oil leakage between the control valve and the power units 59—60, the index 91 would move backward toward the zero point B which would restore the registry of the ports 46—81—44 and replace the lost oil which would also automatically restore the propeller pitch to "7°".

If the handle index 100 is moved forward to 15° on the scale 92, the propeller pitch will be flattened out to "neutral". This condition is advantageous while the motor is "warming up" and in "landing" since a good working motor speed can be maintained without any propeller thrust.

When the index 100 is at "15°" or "neutral", the index 91 of the "responder" is also at "15°".

To increase the pitch from "neutral" to a coarser pitch, the handle 49 is moved rearward registering pointer 101 on graduation 92 on quadrant 51. This rotates the control valve 45 and brings its discharge ports 83—84 into registry with the passage 82 and the discharge port 43.

The propeller in assuming its coarser pitch, due to its normal urge in that direction because of impinging against the air, causes the forward movement of the collar 35. This moves the pistons in the power units to discharge the impounded oil through 83—82 and the return outlet 43 back into the oil circulating system through the tube 55. This reverse movement of the pistons is communicated to the wire 97 which causes a rotation of the responder valve 80 synchronously with the rotation of the control valve 45. When the responder valve 80 has overtaken the control valve, it has moved the passage port 82 out of registry with the port 83 which arrests the further movement of the escaping oil and holds the propeller pitch at any degree selected by the handle 49.

When the pitch has attained its maximum with the collar 35 abutting the end of the hub 3, the responder index 91 registers zero B on the scale 92 and index 100 on zero A. This puts the passage ports 82 and 81 in the positions shown in Figs. 7—8 with both inlet and outlet ports 41—42—43 closed, with the propeller working full thrust ahead.

In maintaining a selected pitch angle, the handle 49 is moved until either of the indices 100 or 101 registers the desired degree depending upon whether the pitch change is from coarse to neutral or vice versa. When the index 91 responds to the same degree, the handle can be moved to zero A which locks the propeller against further pitch changes in either direction, except that leakage will be automatically restored as previously described.

In "taking off" or in "climbing" where the increased power incidental to high motor speed is desirable, the propeller pitch can be decreased to the capacity of the motor to maintain its maximum power. The advantages of variable pitch propellers is now well established and their general adoption is dependent upon reliable and positive control such as provided in the present invention.

Having thus described the invention, what I claim and desire to secure by Letters Patent is:

1. A variable pitch propeller including a fluid pressure means adapted to vary the pitch of said propeller; a manual control valve assembly in said pressure means including a control valve having cut-off ports therein; and a responder valve having ports cooperative with said cut-off ports, and actuated by variations in the pitch of said propeller in synchronism with said control valve independent of said manual control.

2. In a variable pitch propeller including a fluid pressure means adapted to vary the pitch of said propeller; a manual control assembly in said pressure means including a control valve having cut-off ports therein; a graduated scale on said assembly; a responder valve having ports cooperative with said cut-off ports and actuated by variations in the pitch of said propeller in synchronism with said control valve independently of said manual control; indexes on said control valve and responder valve respectively and registering on said scale.

3. In a variable pitch propeller including a fluid pressure actuating unit adapted to vary the pitch of said propeller; a fluid pressure pump; a control valve block having inlet, outlet and return ports; conduits extending between said pump and said inlet and return ports respectively, and between said outlet port and said unit; a control valve having cut-off ports coacting with said inlet, outlet and return ports; a responder valve actuated by variation in the pitch of said propeller independent of said control valve, movable within said control valve and adapted to move in synchronism with the movement of said control valve.

4. In a variable pitch propeller including a fluid pressure actuating unit adapted to vary the pitch of said propeller; a fluid pressure pump; a control valve block having inlet, outlet and return ports; conduits extending between said pump and said inlet and return ports respectively, and between said outlet port and said unit; a control valve having cut-off ports coacting with said inlet, outlet and return ports; a responder valve actuated by variation in the pitch of said propeller by means independent of said control valve and movable within said control valve and adapted to move in synchronism with the movement of said control valve; and indexes on said control valve and responder valve respectively.

LIZANDRO FERNANDEZ CASTRO.